March 30, 1965 W. T. MORRISON ETAL 3,175,247
METHOD AND APPARATUS FOR COATING WELDING RODS
Filed March 26, 1962
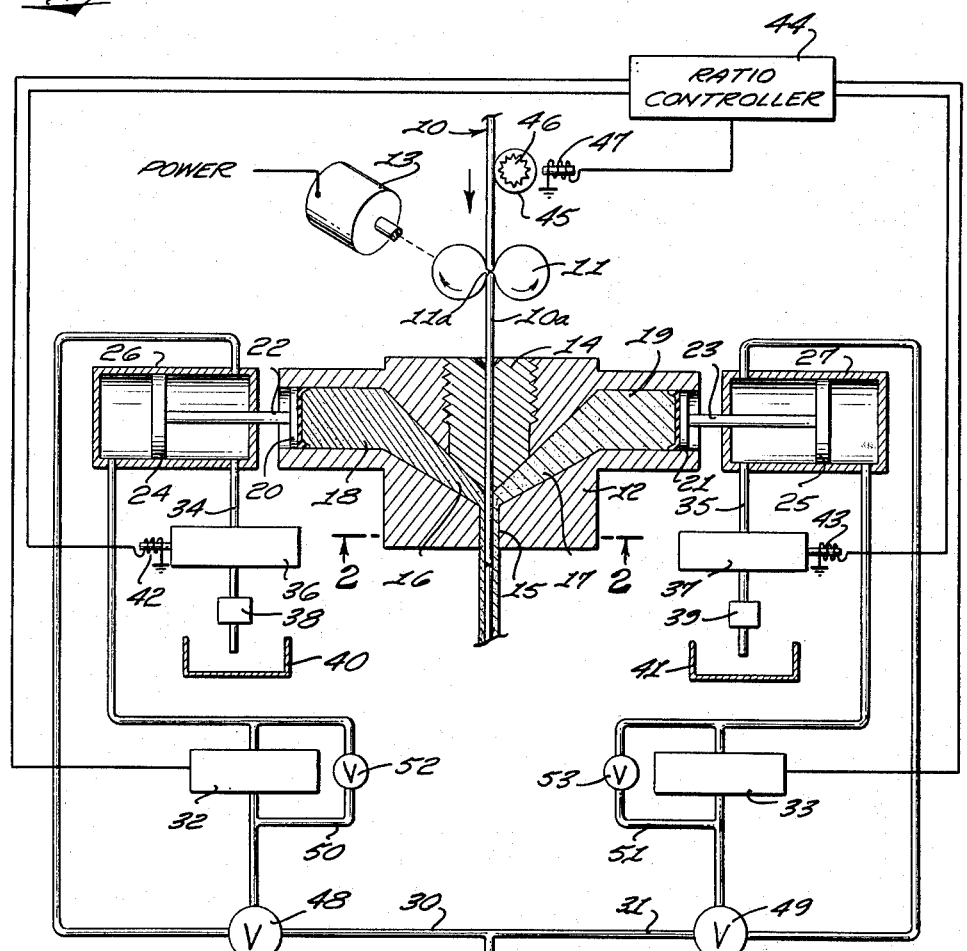
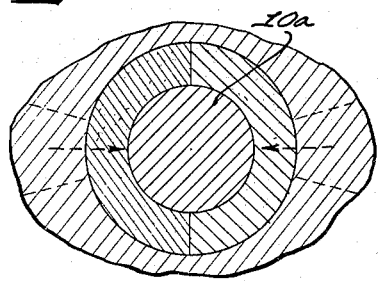
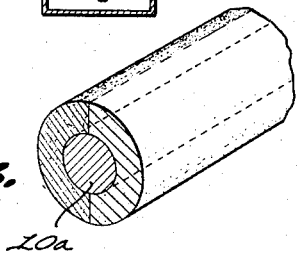
INVENTORS
WALLACE T. MORRISON
CHARLES A. STOODY
BY
Hazard & Miller
ATTORNEY

United States Patent Office 3,175,247
Patented Mar. 30, 1965

3,175,247
METHOD AND APPARATUS FOR COATING
WELDING RODS
Wallace T. Morrison and Charles A. Stoody, Whittier, Calif., assignors to Stoody Company, Whittier, Calif., a corporation of California
Filed Mar. 26, 1962, Ser. No. 182,295
9 Claims. (Cl. 18—13)

This invention relates to a method and apparatus for coating welding wires and welding rods.

Explanatory of the present invention it has long been common practice to coat welding wires and welding rods with various materials. Frequently these materials are merely fluxes which contribute to the deposit and protection of the weld metal in the course of welding. The coatings may, however, contain alloying ingredients which dissolve in or combine with the metal of the wire or rod itself during the welding. A former practice for coating welding rods was to dip the rods one or more times in a fluid or semi-fluid coating composition after which the coating composition was allowed to dry or the coating composition was baked on the rod in an oven. When rods were dipped the coating composition was usually equally distributed on all sides of the rod an consequently it was perfectly concentric therewith. However, the process of dipping and drying or baking was not only laborious but time-consuming.

To overcome the objections of dipping it has heretofore been proposed to run the wire or rod material through an extruding head so as to apply the coating material to the exterior of the rod by extrusion. In such an extruding head the wire or rod material enters the extruding head through a closely fitting die or orifice and passes therefrom into a clearance space. The coating material is forced into the clearance space and is intended to surround the wire or rod as it passes therethrough so that as the coated wire issues from the extruding head it is intended that the coating not only completely surround the wire but be concentric therewith. However, all extruding heads heretofore used for the coating of welding rod or wire insofar as we are aware have had but a single inlet for the coating material. This discharges into the clearance space under pressure against the unsupported length of wire or welding rod therein with the result that the wire or rod is displaced laterally to some extent. Consequently when the coating has been heretofore applied by extrusion it is relatively if ever concentric with the wire or rod. When the coating is non-concentric or eccentric with respect to the wire or rod "fingernailing" will occur when the wire or rod is used in welding. This is due to the fact that the coating on that side of the wire or rod which is the thickest is the slowest to burn or dissolve during the welding. It is consequently important in applying coatings to welding wires and welding rods by extrusion that the coating material be evenly distributed about the wire and that the coating and wire be perfectly concentric with respect to each other so that "fingernailing" will not occur during use.

A primary object of the present invention is to provide an improved method and apparatus for producing coated welding rods by extrusion wherein such a high degree of concentricity between the wire and the coating can be obtained.

More specifically, an object of the invention is to provide a method and apparatus for coating welding wires and rods by extrusion wherein the coating material is forced under pressure into the extrusion head from opposite sides thereof so that pressures effective as forces on the sides of the wire will tend to balance and neutralize each other whereby the unsupported length of wire in the clearance space will remain centrally located therein while the coating material is flowing thereabout.

While the coating materials supplied to opposite sides of the extruding head may be and frequently are not only of the same composition but are of the same color, by incorporating contrasting pigments in the compositions supplied to the opposite sides of the extruding head the resulting product may be in the form of a longitudinally striped coated rod and the contrasting colors utilized to identify the rod either as to its source of manufacture or as to the nature of the deposit that will be produced thereby in the course of welding.

With the foregoing and other objects in view, which will be made manifest in the following detailed description and specifically pointed out in the appended claims, reference is had to the accompanying drawings for an illustrative embodiment of the invention, wherein:

FIGURE 1 is a diagrammatic view of the apparatus that may be employed to perform the method of producing coated welding rods by extrusion in accordance with the present invention;

FIG. 2 is a transverse section through the extruding head taken substantially upon the line 2—2 upon FIG. 1; and FIG. 3 is a partial view in perspective of the type of welding rod or welding wire produced in accordance with the present invention.

Referring to the accompanying drawings wherein similar reference characters designate similar parts throughout, the welding wire or rod that is to be coated is illustrated at 10. This rod is usually supplied in the form of a long coil of heavy steel wire. It is fed by means of power-driven feed rolls 11 into the extruding head generally indicated at 12. The feed rolls can be driven by any source of power such as an electric motor 13 and are geared together by gearing, not shown, so that they will rotate synchronously in opposite directions as indicated by the arrows applied thereto.

Opposed cutters 11a are in the peripheries of these rolls and pinch or divide the wire at intervals into welding rod lengths 10a. Where the rod 10a enters the extrusion head 12 it passes through a closely fitting throat or die 14. After passing through the throat the cut wire or rod 10a enters a clearance space 15 in which the rod 10a is unsupported. The walls of this clearance space or extruding throat are concentrically arranged with relation to the rod 10a as it issues from the die or throat 14.

In accordance with the present invention there are two inlets 16 and 17 that lead into the clearance space or extruding throat 15 in diametrically opposite sides thereof so that the coating composition that is forced through these inlets 16 and 17 under pressure will be balanced and will impose no net effective lateral force on the rod 10a tending to laterally displace the unsupported length of rod that is in the extruding throat. The two inlets 16 and 17 communicate respectively with cylinders 18 and 19 in which supplies of pasty coating composition can be placed.

The coating composition is expelled from the cylinders 18 and 19 through the inlets 16 and 17 by the pistons 20 and 21 of hydraulic rams which have piston rods 22 and 23 operable by pistons 24 and 25 in hydraulic cylinders 26 and 27.

When the pistons 24 and 25 are actuated by the admission of fluid pressure to the head ends of their respective cylinders 26 and 27, pistons 20 and 21 are forced towards each other thus expelling the coating composition from the cylinders 18 and 19 through the inlets 16 and 17 and into the extruding throat so as to equally coat the rod about opposite sides thereof as illustrated in FIGS. 2 and 3. After the cylinders 18 and 19 have been exhausted of coating composition the cylinders 26 and 27 are moved outwardly so as to withdraw the pistons 20 and 21 from the cylinders 18 and 19. While the pistons 20 and 21 are withdrawn the cylinders 18 and 19 are respectively re-loaded with coating composition. The pistons 20 and 21 are then returned to the outer ends of the cylinders 18 and 19 and operations may be resumed.

While the compositions supplied to the cylinders 18 and 19 are intended to be of the same consistency with respect to stiffness and frequently are of the same stiffness, it frequently occurs that the composition supplied to one cylinder is stiffer than that supplied to the other or the composition supplied to one cylinder contains portions that are stiffer than the remainder thereof or that which is in the other cylinder. This may be due to the fact that one composition supplied to one cylinder is drier than that which is supplied to the other or contains drier portions. Regardless of the lack of uniformity between the two compositions supplied to the cylinders 18 and 19, respectively, it is important that equal volumes of both compositions be simultaneously fed to the extruding throat 13 through the opposed inlets 16 and 17 in order to maintain true concentricity between the rod 10a and its surrounding coating.

To accomplish this result the pump 28 which supplies liquid from a sump or reservoir 29 to the branched conduits 30 and 31 delivers liquid under pressure to the head ends of the cylinders 26 and 27 through remotely controlled metering valves. The pressure in the conduits 30 and 31 supplied by pump 28 is constantly maintained above any anticipated working pressure required to expel the compositions from cylinders 18 and 19. Consequently, there is always available in the head ends of the cylinders 26 and 27 more than the required pressure to expel the compositions in cylinders 18 and 19 through the inlets 16 and 17 into the extruding throat 15. Furthermore, the pressures in the head ends of cylinders 26 and 27 need not be equal to each other. On the contrary the pressure in the head end of one cylinder may exceed the pressure in the head end of the other cylinder considerably.

The metering valves 32 and 33 are electrically controlled and serve to control the volume of liquid flow from the pump 28 to each cylinder 26 and 27.

The piston rod end of the cylinders 26 and 27 have fluid outlets 34 and 35 which lead to flow meters 36 and 37. The outlets from the flow meters 36 and 37 lead through spring-actuated check valves 38 and 39 to sumps or reservoirs 40 and 41. These sumps or reservoirs may be the same as or may be in communication with the sump or reservoir 29. The spring-actuated check valves 38 and 39 are designed to merely impose a small back pressure in the outlets 34 and 35 and to prevent reverse flow of air through the outlets. The flow meters 36 and 37 are in the nature of rotatable turbines, each of which has an electromagnetic pick-up indicated at 42 and 43 so that electrical impulses will be transmitted from the pick-ups to an analog ratio controller so that the controller is responsive to the rate at which the wire 10 is fed toward the extruding head 12. The output of the analog ratio controller 44 is electrically connected to the remote controlled metering valves 32 and 33 that control the supply of fluid to the head ends of cylinders 26 and 27. When the rod is being fed to the extrusion throat 15 the rate at which the roll 45 rotates causes timed impulses to be transmitted to the ratio controller 44 by the pick-up 47 that is commensurate to the rate at which the rod is passing through the throat. Fluid pressure from pump 28 is supplied to the head ends of the cylinders 26 and 27 and liquid in the cylinders in the piston rod ends thereof will be expelled therefrom through the outlets 34 and 35 in direct proportion to the amount of coating composition that is being expelled from cylinders 18 and 19 through the inlets 16 and 17.

The rate at which the liquid is being expelled from the piston rod ends of the cylinders 26 and 27 is measured by the flow meters 36 and 37 and proportionate electrical impulses that are proportionate to the amount of fluid expelled from the cylinders 26 and 27 are transmitted by the pick-ups 42 and 43 to the ratio controller. With this arrangement, if the coating composition in cylinder 18 is more readily expelled from that cylinder than the coating composition in cylinder 19, then the pressure in cylinder 18 will be less than the pressure in cylinder 19. However, regardless of the inequality in pressures since equal volumes are to be discharged through the inlets 16 and 17 as movement of the pistons 20 and 21 is controlled by what is expelled from cylinders 26 and 27, pressure differential between the head ends of cylinders 26 and 27 has no effect. Conversely, if the composition in cylinder 18 is less readily expelled from that cylinder than the composition in cylinder 19, then the pressure in cylinder 18 will be greater than the pressure in cylinder 19. However, as the rate at which pistons 20 and 21 can move to expel their respective compositions is governed or controlled by the fluid expelled through the outlets 34 and 35 both pistons will move at the same rate and expel equal volumes irrespective of pressure. Consequently, if the composition in cylinder 18 is more readily expellable from that cylinder than the composition in cylinder 19 an increase in the rate at which liquid is expelled from cylinder 26 through outlet 34 past the flow meter 36 is promptly transmitted to the ratio controller 44. The ratio controller causes the remotely controlled metering valve 32 to which it is electrically connected to throttle down the amount of liquid that is supplied to the head end of cylinder 26. In this way, a constant volumetric balance is maintained between the amounts of coating composition that is fed to the extruding throat to the two inlets 16 and 17 that is independent of the pressures that may exist in the head ends of cylinders 26 and 27, and consequently in the cylinders 18 and 19. Thus, even though the pressure in the head end of cylinder 27 is greatly in excess of the pressure in the head end of cylinder 26 to expel the composition from cylinder 19, nevertheless this difference in pressure is not effective to cause a greater amount of coating composition to be expelled from cylinder 19 than is expelled from cylinder 18. The amount expelled from cylinders 18 and 19 is consequently volumetrically the same regardless of the degree of pressure that is effective thereon and is directly proportional to the amounts of fluid expelled from the piston rod ends of cylinders 26 and 27 as measured by the flow meters 36 and 37.

As a means for returning the pistons 24 and 25 to the head ends of their respective cylinders, the conduits 30 and 31 may be equipped with four-way valves 48 and 49 which enable fluid pressure supplied by pump 28 to be transmitted to the piston rod ends of the cylinders 26 and 27. When fluid pressure is supplied to these ends of the cylinders the pistons 24 and 25 will be moved toward the head ends of their respective cylinders to withdraw the pistons 20 and 21 for the purpose of reloading cylinders 18 and 19.

The remotely controlled valves 32 and 33 are equipped with bypasses 50 and 51 in which there may be valves 52 and 53 either manually or electrically connected to the four-way valves 48 and 49 so that as the pistons 24 and 25 move toward the head ends of their respective cylinders 26 and 27, the liquid expelled therefrom may bypass the valves 32 and 33 and be returned to sumps 54 and 55 which may be the same as or in communication with the sump or reservoir 29.

From the above-described method and apparatus it will be appreciated that by forcing the coating composition into the extrusion head 12 from two opposed inlets, that the coating composition will be distributed equally on all sides about the rod 10a formed from the wire 10. The coating consequently will remain perfectly concentric with the wire so that "fingernailing" will be avoided at the time the welding rod is used. The composition supplied to one of the cylinders 18 or 19 may have a pigment incorporated therein that is in contrast with the pigment of the other cylinder so that one-half of the rod 10a will be coated with a coating composition of one color as illustrated in FIG. 3, and the other half will be coated with a coating composition of a contrasting color. The compositions may otherwise be of the same chemical or metallurgical composition. The result obtained is a longitudinally striped welding rod having contrasting colors. These contrasting colors applied in this manner may be either to identify the manufacturer or to identify the nature of the welding rod and its coating composition and thus indicate the nature of the deposit that will be produced by the welding rod in making a weld.

Various changes may be made in the details of construction without departing from the spirit and scope of the invention as defined by the appended claims.

We claim:

1. In combination, an extruding head having a central passage, means for moving welding rod axially therethrough, said extruding head having opposed inlets communicating with the central passage, means for discharging coating material through said opposed inlets including two opposed hydraulic rams and cylinders therefor from one end of each a piston rod extends, means for supplying fluid pressure to the cylinders at the head ends of the rams and exhausting fluid from the piston rod ends thereof, means responsive to the rate at which the rod is passed through the extruding head, means responsive to the rate at which fluid is exhausted from the piston rod end of each ram, means for regulating the rate of flow from the fluid pressure source to the head ends of the rams and control means responsive to the rate at which rod is passed through the extrusion head and to the rate at which fluid is exhausted from the piston rod end of each ram for regulating the supply of fluid to the head of each ram whereby the coating material will be discharged equally volumetrically through each inlet and commensurately with the rate of movement of the welding rod therethrough.

2. In combination, an extruding head having a central passage, means for moving linear material to be coated axially therethrough, said extruding head having a plurality of inlets communicating with the central passage, means for discharging coating material through said inlets including a hydraulic ram and a cylinder therefor for each inlet, means for supplying fluid pressure to the head end of each ram effective to cause each ram to discharge coating material through its inlet into the central passage, means for exhausting fluid from the cylinder for each ram as it expels coating material through its inlet, means responsive to the rate at which the linear material is fed to the extruding head, means responsive to units of volume of fluid exhausted from each ram, means for throttling the fluid pressure supplied to each ram, ratio controlling means influenced by the means responsive to the rate at which the linear material is fed to the extruding head and to the means responsive to the volumes of fluid exhausted from each ram and controlling the throttling means that throttles the fluid pressure supplied to each ram whereby the volumes of coating material expelled through each inlet will be equal irrespective of the pressures required to expel the coating materials through their respective inlets or the pressures supplied to their respective rams.

3. In combination, an extruding head having a central passage through which a linear material may be axially passed and having lateral inlets communicating with the central passage through which coating material may be forced to coat the linear material, variable means for expelling the coating material through each inlet at various volumetric rates, means indicative of the volumetric rate at which coating material is expelled through each inlet, a ratio controller influenced by all of the last mentioned means, and means influenced by the ratio controller for varying the variable means whereby the volumes of coating materials expelled through the inlets would be equal regardless of the pressures required to expel the coating materials through their respective inlets.

4. A combination as defined in claim 3 wherein there is a means responsive to the rate of which the linear material is passed through the extruding head which also influences the ratio controller and which in turn varies the variable means to increase and decrease the rate at which coating material is discharged with increases and decreases of the rate at which the linear material is passed through the extruding head.

5. An apparatus for applying coating to a linear material comprising an extruding head through which the linear material may be axially passed and having a plurality of inlets through which coating material may be expelled against the linear material, variable means for expelling the coating material through each inlet at various volumetric rates, means indicative of the volume of coating material expelled through each inlet, and control means influenced by all of the last mentioned means for varying the variable means so that the volumes expelled by each inlet will be equal irrespective of the pressures required to expel the coating material through each inlet.

6. An apparatus as defined in claim 5 wherein there is a means responsive to the rate at which the linear material is passed through the extruding head and the control means is influenced thereby and varies the variable means with variations in the rate at which the linear material is passed through the extruding head.

7. An apparatus for applying coatings to a linear material comprising an extruding head through which the linear material may be axially passed and having lateral inlets through which coating material may be expelled against the linear material as it passes through the extruding head, variable means for expelling equal amounts of coating material through each inlet, means responsive to the rate at which the linear material is passed through the extruding head, and means for varying the variable means in accordance with changes in the rate at which the linear material is passed through the extruding head.

8. An apparatus for applying coatings to linear material comprising an extruding head through which the linear material may be axially passed and having a plurality of inlets through which coating material may be expelled against the linear material, variable means for expelling the coating material through each inlet at various volumetric rates including a hydraulic ram and cylinder therefor for each inlet, means indicative of the volume of coating material expelled through each inlet responsive to the rate at which each ram is operated, and control means influenced by all of the means indicative of the volume expelled, means for varying the variable means so that the volumes expelled by each inlet will be equal irrespective of the pressures required to expel the coating material through each inlet.

9. An apparatus as defined in claim 8 wherein there is a means responsive to the rate at which the linear material is passed through the extruding head and the control means is influenced thereby and varies the variable means with variations in the rate at which the linear material is passed through the extruding head.

References Cited by the Examiner
UNITED STATES PATENTS

| | | | |
|---|---|---|---|
| 1,934,647 | 11/33 | State et al. | 18—13 |
| 2,051,781 | 8/36 | Brown | 18—2 |
| 2,401,550 | 6/46 | Cook | 18—59 |
| 2,779,970 | 2/57 | Stocker | 18—13 |
| 2,916,792 | 12/59 | Cook et al. | 18—2 |
| 3,015,129 | 1/62 | Hays et al. | 18—2 |
| 3,015,133 | 1/62 | Nichols | 18—59 |

MICHAEL V. BRINDISI, *Primary Examiner.*
MORRIS LIEBMAN, *Examiner.*